United States Patent [19]

Mori et al.

[11] Patent Number: 5,675,895

[45] Date of Patent: Oct. 14, 1997

[54] PORTABLE CIRCULAR SAW HAVING A DUST COLLECTING FUNCTION

[75] Inventors: Takashi Mori; Seiji Akiba, both of Hitachinaka, Japan

[73] Assignee: Hitachi Koki Co., Ltd., Tokyo, Japan

[21] Appl. No.: 637,491

[22] Filed: Apr. 25, 1996

[30]     Foreign Application Priority Data

May 12, 1995 [JP] Japan ................................. 7-114379

[51] Int. Cl.[6] ............................................................. B26D 7/18
[52] U.S. Cl. ........................... 30/124; 30/390; 451/456
[58] Field of Search ........................... 30/124, 390, 391; 451/453, 456; 144/252.1

[56]              References Cited

U.S. PATENT DOCUMENTS

| 1,803,068 | 4/1931 | McKeage | 30/390 |
|---|---|---|---|
| 3,262,473 | 7/1966 | Elson | 30/390 |
| 3,662,796 | 5/1972 | Batistelli | 30/390 |
| 4,414,743 | 11/1983 | Pioch et al. | 30/124 |
| 4,675,999 | 6/1987 | Ito et al. | 30/124 |
| 4,870,758 | 10/1989 | Fushiya | 30/390 |
| 4,910,925 | 3/1990 | Longuet et al. | 451/453 |
| 5,005,295 | 4/1991 | Fushiya | 30/390 |
| 5,084,972 | 2/1992 | Waugh | 30/124 |

FOREIGN PATENT DOCUMENTS

| 57-175704 | 11/1982 | Japan . |
|---|---|---|
| 58-15001 | 1/1983 | Japan . |
| 545404 | 7/1993 | Japan . |
| 752570-1 | 2/1995 | Japan . |

*Primary Examiner*—Hwei-Siu Payer
*Attorney, Agent, or Firm*—Pollock, Vande Sande & Priddy

[57]               ABSTRACT

A portable circular saw has a main body (8) accommodating a motor therein, a sawing blade (4) rotated by the motor, a dust casing (3) covering the upper part of sawing blade (4), and a base (9) mounting main body (8). A plurality of partition plates (12a–12e) and a step-up portion (13) are arranged in a hollow space of dust casing (3). These plates (12a) to (12e) and step-up portion (13) have a surface perpendicular to a plane of sawing blade (4). A side wall (17) of dust casing (3) is recessed inward. Base (9) is an aluminum casting product. A link portion (11), provided on base (9), is rotatable about a pivot (18) so as to allow an angular adjustment between base (9) and sawing blade (4).

11 Claims, 4 Drawing Sheets

PORTABLE CIRCULAR SAW HAVING A DUST COLLECTING FUNCTION

BACKGROUND OF THE INVENTION

1. Field of the Invention

The present invention generally relates to a portable circular saw having a function of collecting chip dust generated during the sawing operation.

2. Prior Art

A conventional portable circular saw, having a dust collecting function, will be hereinafter explained with reference to FIGS. 5 to 8.

In general, the portable circular saw is not free from chip dust since it is used to cut a woody-or-the-like construction material 1. To collect such chip dust 2, the conventional portable circular saw comprises a dust casing 3 having a hollow space or container collecting chip dust 2 therein.

Besides dust casing 3, the circular saw comprises a main body 8 and a base 9. Dust casing 3 is installed at the side of main body 8, and base 9 is provided at the bottom of main body 8. After base 9 is placed on a flat surface of woody-or-the-like construction material 1, a sawing blade 4 is driven by a motor accommodated in main body 8 so as to rotate in a counterclockwise direction in FIG. 8. Namely, the leading edge of sawing blade 4 rotates in the upward direction, while the trailing edge of sawing blade 4 rotates in the downward direction. Then, the circular saw is moved or shifted right so that woody-or-the-like construction material 1 is sawed by the leading edge of sawing blade 4 rotating in the upward direction.

Hence, chip dust 2, generated during such sawing operation, is blown upward along an arrow "A" by the inertia moment of sawing blade 4 and also by the air flow caused by the rotation of sawing blade 4.

Dust casing 3 has an opening 7 at a position just above the leading edge of sawing blade 4. The chip dust 2, immediately after blown upward, is introduced into the hollow space of dust casing 3 through opening 7.

Chip dust 2, after passing through opening T together with air introduced, collides with inside walls 5 and 6 of dust casing 3 and is reflected by the inside walls 5 and 6. Otherwise, chip dust 2 passes through a space "a" near the inside wall 5 and 8 and flows along the inside walls 5 and 6 as shown by an arrow "b". Through such collision or elongated flow, the flow of introduced air in the dust casing 3 is decelerated so that chip dust 2 is separated from the flow of air. Hence, chip dust 2 is settled or accumulated on the bottom of dust casing 3, while air is discharged through opening 7 to the outside.

According to the above-described conventional portable circular saw, chip dust 2 will be effectively collected if chip dust 2 has a specific gravity sufficiently large to fall down and settle on the bottom of dust casing 3 when the flow of air is decelerated. However, the construction material 1 to be cut or processed is not limited to wood only. For example, siding materials or light-weight concrete foams are used as exterior wall materials for houses and buildings. These siding or light-weight concrete form construction materials include cement as an essential component. Hence, chip dust 2, generated when these materials are cut by the circular saw, would chiefly contain cement dust whose particles are so fine or small that chip dust 2 cannot fall down or settle easily on the bottom of dust casing 3.

Accordingly, the above-described conventional portable circular saw has dust casing 3 not desirable in the configuration to effectively collect chip dust 2 when chip dust 2 has a specific gravity relatively small. When the specific gravity is small, chip dust 2 possibly flows out of dust casing 3 through opening 7, being guided by the flow of air. Thus, the efficiency of collecting dust is worsened unexpectedly.

Furthermore, according to the above-described conventional portable circular saw, dust casing 3 has a side wall 17 protruding laterally with respect to sawing blade 4, as shown in FIGS. 5, 7 and 8. Hence, the leading edge of sawing blade 4 cannot be seen from the direction of "B". Having such dust casing 3 will be disadvantageous to use the above-described conventional circular saw in a specific sawing operation requiring frequent and random interruption of sawing operation (e.g. in an sawing operation of opening a window).

The base 9 is generally a steel press product which may be deformed when a strong force is applied thereon during the sawing operation. This deformation will cause an undesirable gap between blade opening 10 and woody-or-the-like construction material 1. Thus formed gap will allow chip dust 2 to leak to the outside, deteriorating the efficiency of dust collection.

As shown in FIG. 7, a link portion 11 is provided on base 9 to adjust a cutting depth of sawing blade 4. There is a possibility that link portion 11 may be forcibly bent or deformed when a strong force is added in the sawing operation. Such bending or deformation will deteriorate the normality (i.e. perpendicularity) of sawing blade 4 with respect to base resulting in the failure in guiding chip dust 2 into dust casing 3 through opening 7 and therefore lowering the efficiency of dust collection.

SUMMARY OF THE INVENTION

Accordingly, in view of above-described problems encountered in the prior art, a principal object of the present invention is to provide a novel and excellent portable circular saw having a dust collecting function which is capable of solving the above-described problems and assuring a higher dust collecting efficiency.

In order to accomplish this and other related objects, one aspect of the present invention provides a novel and excellent portable circular saw having a dust collecting function. The portable circular saw of the present invention comprises a main body accommodating a motor therein, a sawing blade rotated by the motor, a base provided at a lower part of the main body, a dust casing covering an upper part of the sawing blade for collecting chip dust, and deceleration means provided in the dust casing for decelerating the chip dust when the chip dust is introduced together with air into the dust casing.

According to features of a preferred embodiment, the deceleration means is a partition plate or a stepped portion which has a surface perpendicular to a plane of the sawing blade. It is preferable that the dust casing has a side wall recessed inward. The base is an aluminum casting product. A link portion is provided on the base, so as to be rotatable about a pivot and fixed at an adjusted angle with respect to the base by a screw.

Furthermore, according to the features of the preferred embodiment of the present invention, the deceleration means is a plurality of partition plates separately arranged in a hollow space in the dust casing. The plurality of partition plates form a circulating path for guiding and decelerating introduced air containing the chip dust. The circulation path has an entire length smaller than that of an inside wall of the dust casing. The circulation path is triangular. Some of the plurality of partition plates separate the flow of the dust-containing air into two directions. All of the plurality of partition plates are provided in the upper half of the dust casing. The dust casing has an opening at a position just above a leading edge of the sawing blade, and one of the plurality of partition plates is disposed near the opening so as to reflect the introduced air containing the chip dust.

Furthermore, according to the features of the preferred embodiment of the present invention, the deceleration means is a combination of a partition plate and a step-up portion. The partition plate extends downward from an upper inside wall of the dust casing, while the step-up portion is provided on the upper inside wall near the partition plate. Thus, the dust-containing air collides with the step-up portion immediately before the chip dust reaches the partition plate.

BRIEF DESCRIPTION OF THE DRAWINGS

The above and other objects, features and advantages of the present invention will become more apparent from the following detailed description which is to be read in conjunction with the accompanying drawings, in which.

DETAILED DESCRIPTION OF THE PREFERRED EMBODIMENT

Figure 1:
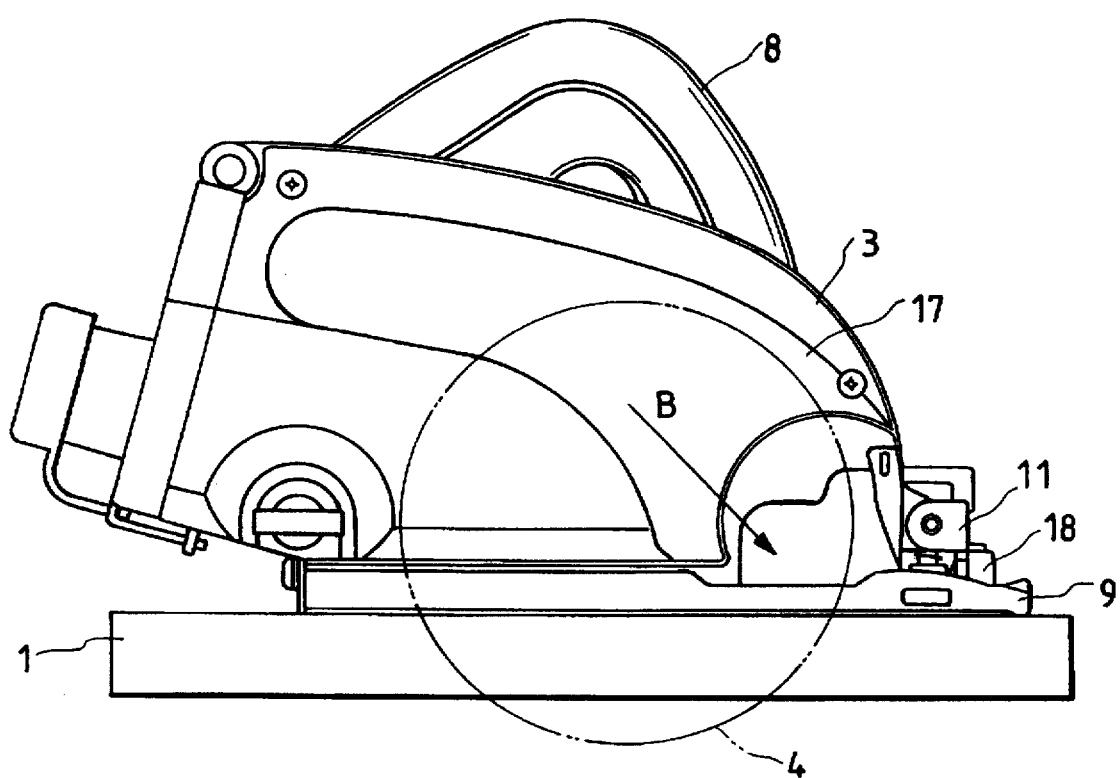
FIG. 1 is a front view showing one embodiment of a portable circular saw having a dust collecting function in accordance with the present invention.
Figure 2:
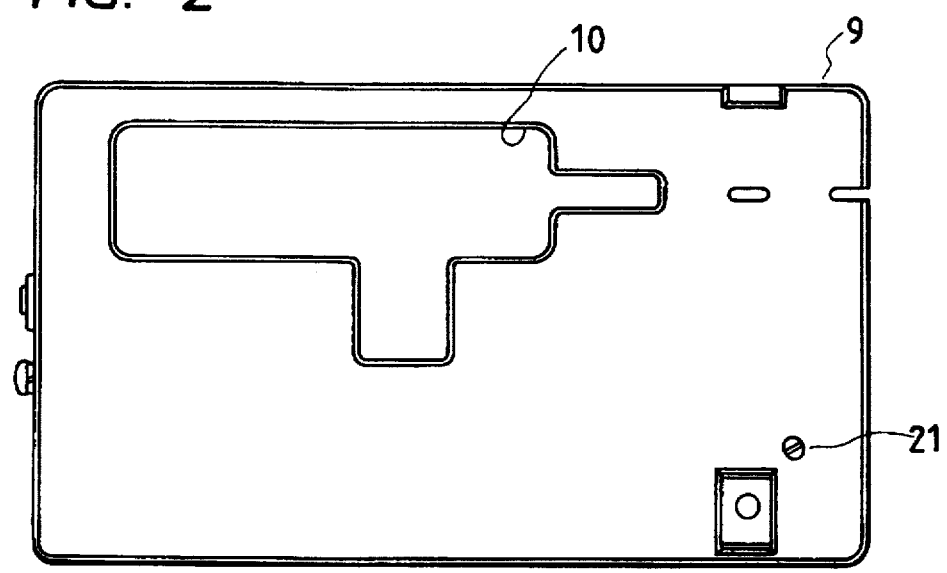
FIG. 2 is a bottom view showing a base of the portable circular saw shown in FIG. 1.

A preferred embodiment of the present invention will be explained in greater detail hereinafter, with reference to FIGS. 1 through 4. Identical parts are denoted by an identical reference numeral throughout views.

The portable circular saw having a dust collecting function in accordance with the present invention has a main body 8 accommodating a motor therein, a transmitting means such as a gear train for transmitting a rotational force to a sawing blade 4.

Sawing blade 4 is rotated in a counterclockwise direction in FIG. 1. The leading edge of sawing blade 4 rotates in the upward direction, while the trailing edge of sawing blade 4 rotates in the downward direction. Then, the circular saw is moved or shifted right in the drawing so that woody-or-the-like construction material 1 is sawed by the leading edge of sawing blade 4 rotating in the upward direction.

Chip dust 2, generated during such sawing operation, is blown upward along an arrow "A" by the inertia moment of sawing blade 4 and also by the air flow caused by the rotation of sawing blade 4.

To collect such chip dust 2, the portable circular saw comprises a dust casing 3 having a hollow space or container collecting chip dust therein. The dust casing is installed adjacently to the main body 8 so as to cover the upper part of sawing blade 4.

Dust casing 3 has an opening 7 at a position just above the leading edge of sawing blade 4. The chip dust 2, immediately after blown upward, is introduced into the hollow space of dust casing 3 through the opening 7.

Chip dust 2 and air, once introduced into the hollow space of dust casing 3, are quickly decelerated due to expansion of the area of a passage through which chip dust 2 and introduced air flow. Then, the introduced air and chip dust 2 collide with a first partition plate 12a provided near the opening 7 at an incident angle $\theta_1$. Then, the dust-containing air is decelerated and reflected from first partition plate 12a at an angle $\theta_2$ toward a direction shown by an arrow "b", along an upper inside wall 15 of dust casing 3.

Then, the dust-containing air collides with a second partition plate 12b extending downward from the upper inside wall 15 perpendicularly to a flat base 9 provided at the bottom of the circular saw. A step-up portion 13 is provided on the upper inside wall 15 near second partition plate 12b, so that the dust-containing air collides with this step-up portion immediately before it reaches second partition plate 12b.

In this flowing process, the dust-containing air is decelerated by the collision to the step-up portion 13 and second partition plate 12b. The flowing direction of the dust-containing air is bent downward by the second partition plate 12b extending downward. Thus, the dust-containing air is guided toward third and fourth partition plates 12c and 12d which are disposed below the second partition plate 12b.

Figure 4:
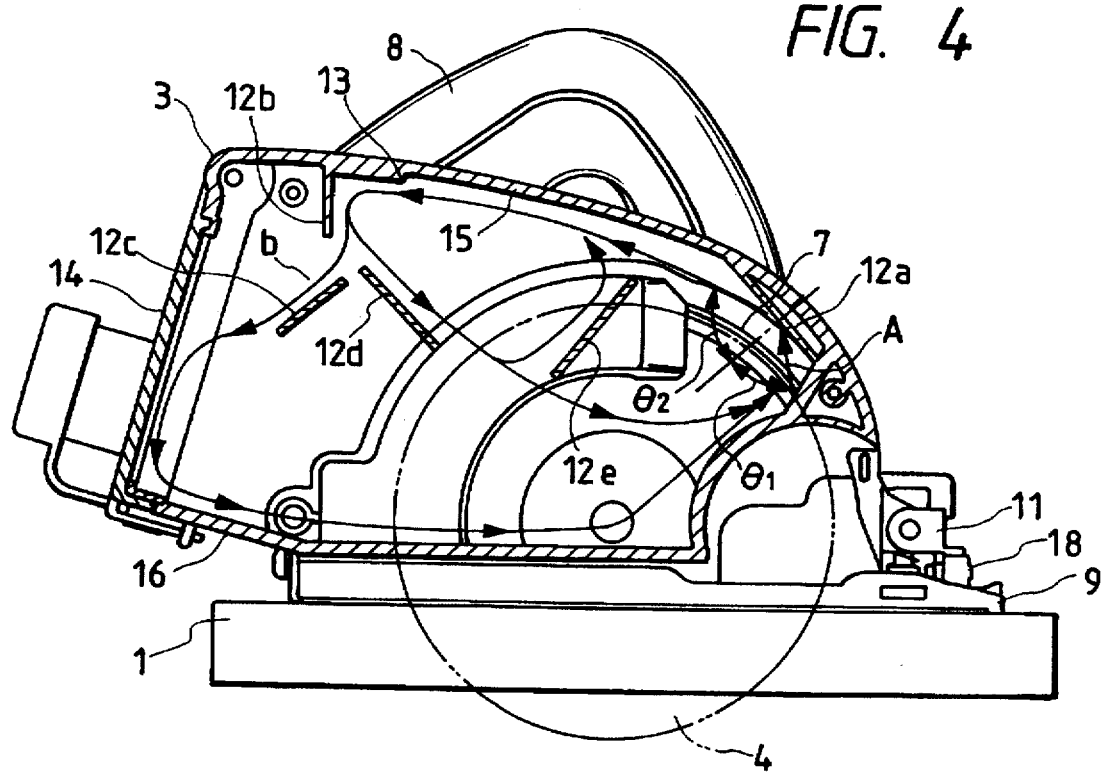
FIG. 4 is a cross-sectional view taken along a line C—C of FIG. 3.
Figure 5:
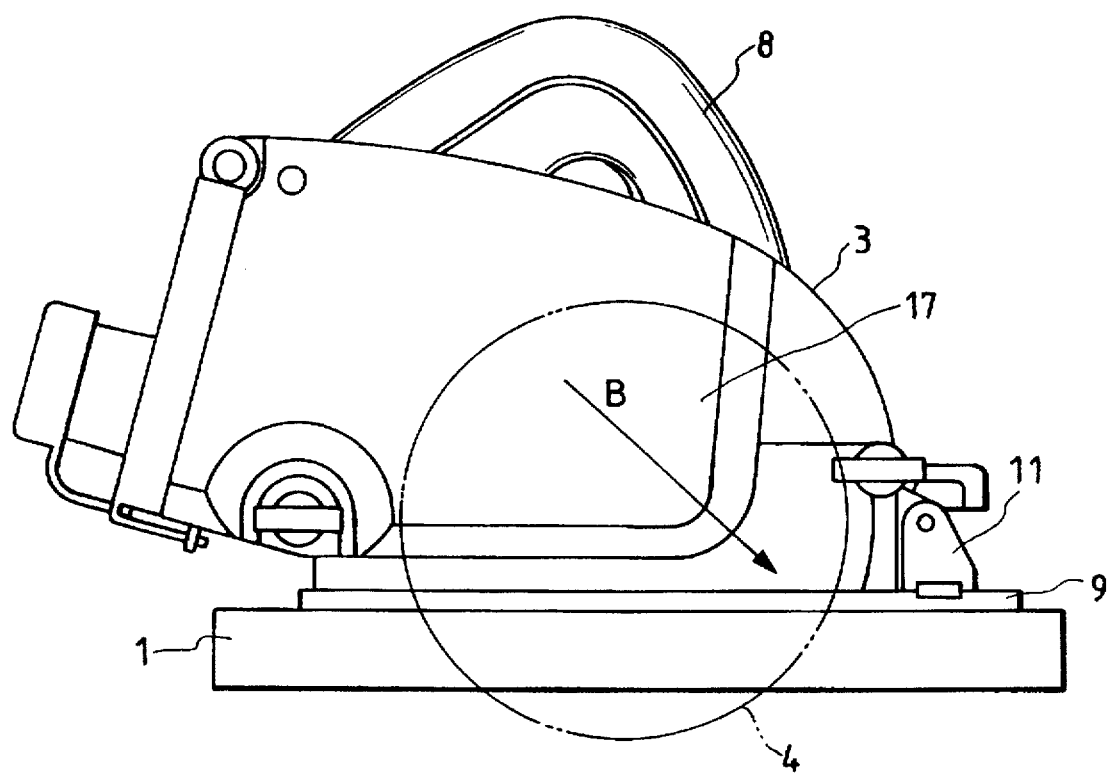
FIG. 5 is a front view showing a conventional portable circular saw having a dust collecting function.
Figure 6:
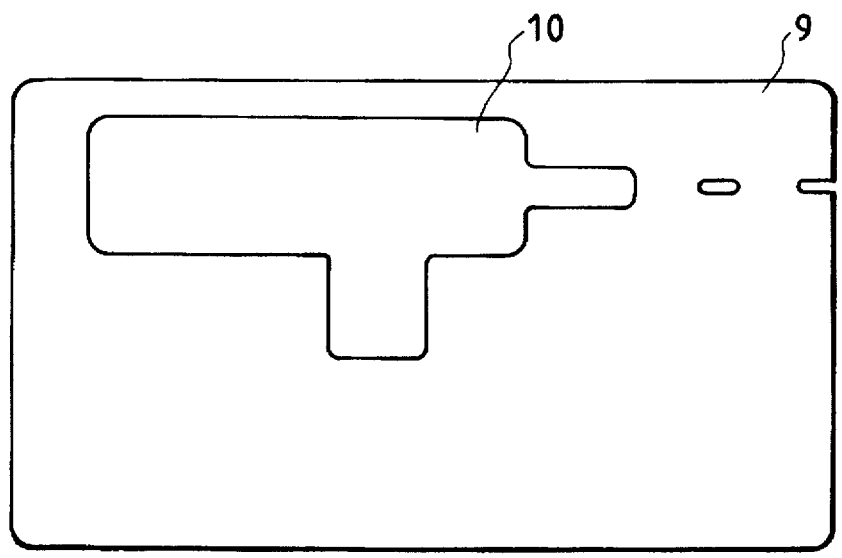
FIG. 6 is a bottom view showing a base of the conventional portable circular saw shown in FIG. 5.
Figure 7:
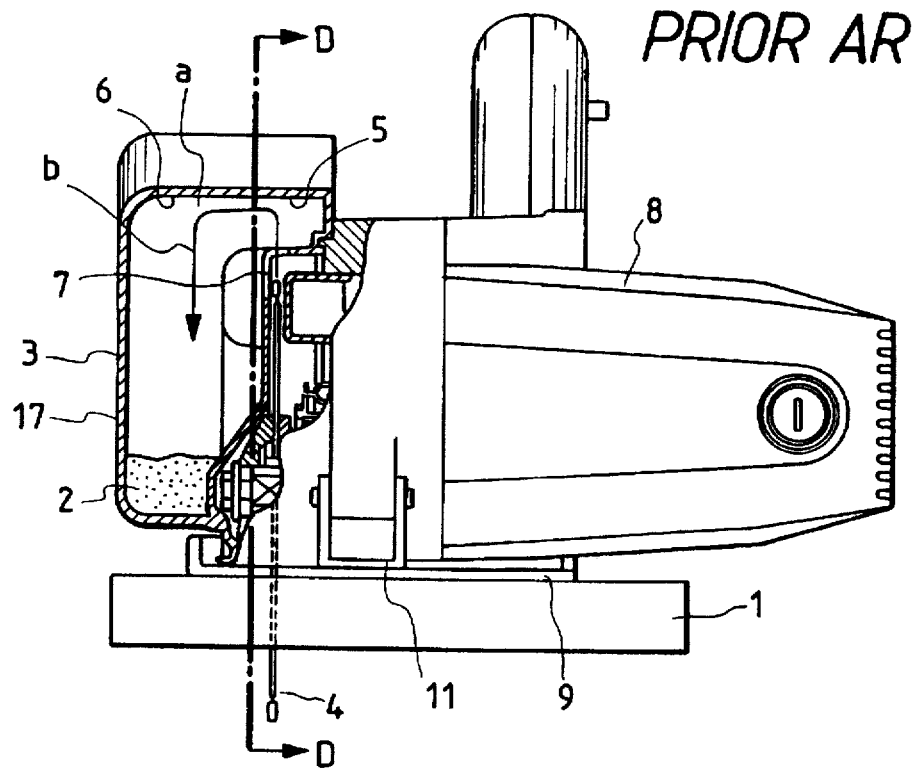
FIG. 7 is a partly sectional view showing the right side of the conventional portable circular saw shown in FIG. 5.
Figure 8:
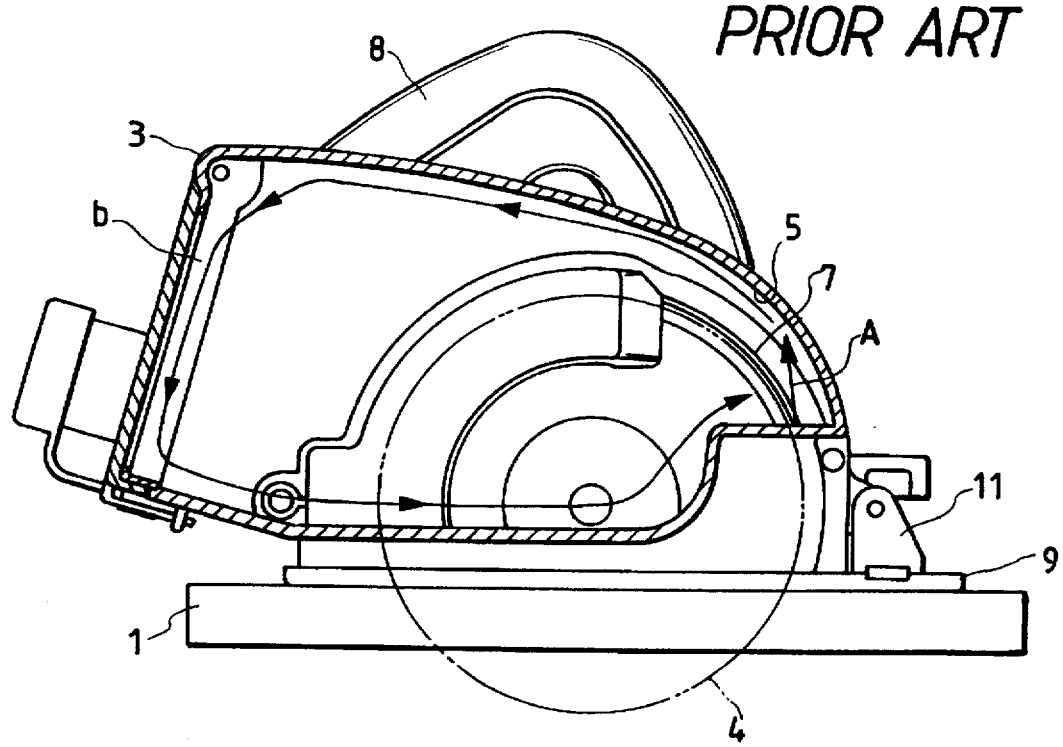
FIG. 8 is a cross-sectional view taken along a line D—D of FIG. 7.

Third and fourth partition plates 12c and 12d have upper ends disposed closely and lower ends disposed remotely, and are inclined at substantially the same angle but in the opposite directions, so as to separate the dust-containing air flow into two streams flowing in the opposite directions, i.e. back and forth directions (right and left direction in FIG. 4).

The dust-containing air flow, when it collides with third partition plate 12c, proceeds toward a rear inside wall 14 with a reduced speed, and then collides with the rear inside wall 14.

On the other hand, the dust-containing air flow, when it collides with fourth partition plate 12d, proceeds in the forward direction with a reduced speed, and then collides with a fifth partition plate 12e. The fifth partition plate 12e has upper and lower ends, the upper end being offset forward from the lower end so as to form an inclined slope guiding the air flow upward to the upper inside wall 15. Thus, the dust-containing air is circulated along a triangular path defined by the upper inside wall 15, second partition plate 12b, fourth partition plate 12d and fifth partition plate 12e, reducing the speed of flow. The entire length of this triangular circulation path is significantly smaller than the entire length of the inside wall (14, 15, 16) of dust casing 3.

If the flowing speed of chip dust 2 is adequately reduced, chip dust 2 falls down to the bottom 16 of dust casing 3 and settles there. If the flowing speed of chip dust 2 is still high, chip dust 2 will be circulated along the above-explained triangular path repetitively until it is adequately decelerated.

Forming a smaller triangular path at the upper part of dust casing 3 is effective not only to control the flow of dust-containing air but also to properly decelerate the chip dust 2. If the circulating path is a circular path, the speed of air flow will not be decelerated promptly. If the circulating path is as large as the air flow path of the prior art, there is the possibility that the dust-containing air may leak out of the dust casing 3 through opening 7.

Some of air flow may be guided toward the first partition plate 12a. If chip dust 2 is sufficiently decelerated, it will fall down to and settle on the bottom 16, otherwise it will again circulate along the upper inside wall 15 together with newly introduced air containing chip dust 2.

Air, separated from chip dust 2, is discharged through opening 7 out of dust casing 3.

Dust casing 3 is separable into two pieces along a vertical plane passing a center thereof. Each of first to fifth partition plates 12a to 12e and step-up portion 13 is formed on each piece of dust casing 3 at the corresponding places. Thus, provision of these first to fifth partition plates 12a to 12e controls the flow on air and effectively decelerates chip dust 2, so that every chip dust 2 is surely settled or accumulated on the bottom 16 of dust casing 3.

All of first to fifth partition plates 12a to 12e are provided in the upper half of dust casing 3.

Figure 3:
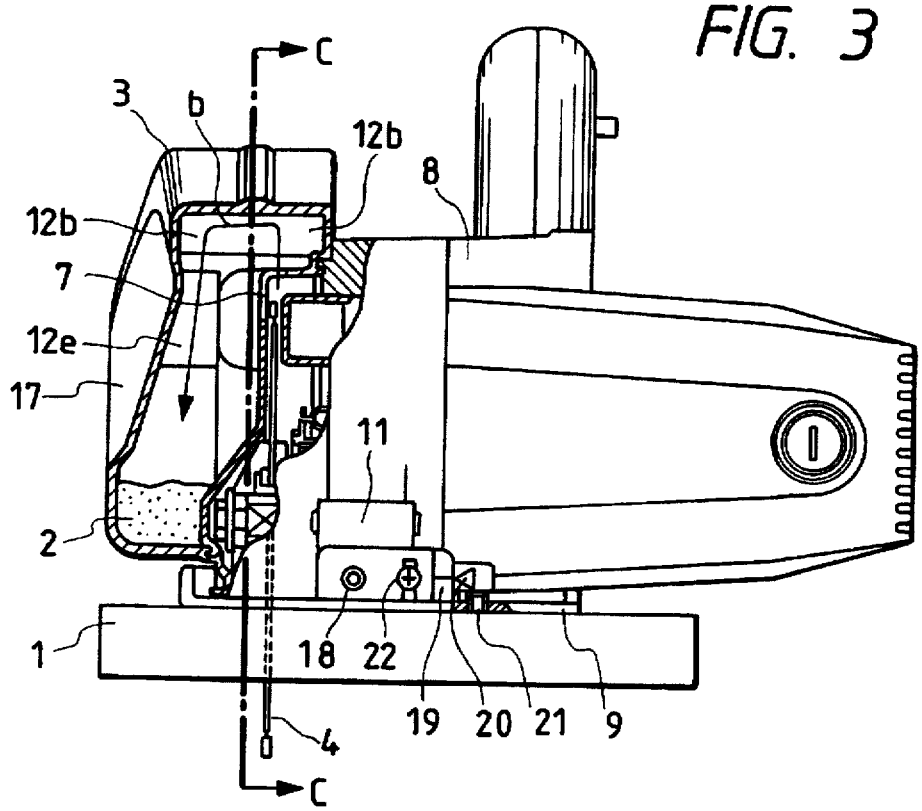
FIG. 3 is a partly sectional view showing the right side of the portable circular saw shown in FIG. 1.

As can be seen from FIG. 3 which shows a cross-sectional view of dust casing 3, an outer side wall 17 of dust casing 3 is recessed deeply inward. Such a recessed configuration of side wall 17 makes it possible to realize a visible layout of the leading edge of sawing blade 4 from the direction of the arrow "B".

Base 9 is an aluminum casting product. From experiments, it was recognized that the maximum deformation amount under a given load is approximately reduced to one third compared with that of the conventional one, maintaining accuracy of the plane of base 9. Accordingly, even if a large force is applied during the sawing operation, it is possible to surely prevent any gap from being formed between base 9 and woody-or-the-like construction material 1.

As can be understood from FIG. 3, a link portion 11 is provided at the front edge of base 9. Link portion 11 adjusts a cutting depth of sawing blade 4. Link portion 11 is rotatable about a pivot 18 and is fixed at an adjusted angle with respect to base 9 by means of a screw 22. Near link portion 11, there is provided a scale 19, an indicator 20 and a screw 21. Although not shown in the drawing, the same set of link portion 11, pivot 18, screw 22 etc. are provided at the rear edge of base 9. With this arrangement, main body 8 is rotatable about pivot 18 on base 9. By adjusting scale 19 and indicator 20 under the condition that link portion 11 is free from bending, it becomes possible to correctly adjust the perpendicularity between base 9 and sawing blade 4. Screw 21 acts as a temporary positioning means and also acts as a fine adjusting means.

In the event that link portion 11 is accidentally bent under a strong force applied during the sawing operation, such a bending can be corrected or fixed by unfastening the screw 22 and then rotating main body 8 about pivot 18 so as to adjust the perpendicularity between base 9 and sawing blade 4. Thus, it is always assured that chip dust 2 is straightly introduced into dust casing 3 through opening 7, maintaining a higher efficiency of dust collection.

Regarding practical design of first to fifth partition plates 12a to 12e, their positions are specified by the following table 1, where "X" is an abscissa and "Y" is an ordinate in the coordinate system having an origin on the center of sawing blade 4.

|  | X-AXIS POSITION | Y-AXIS POSITION |
| --- | --- | --- |
| LEFT END OF 1ST PARTITION PLATE 12a | +31 | +75 |
| RIGHT END OF 1ST PARTITION PLATE 12a | +56 | +46.5 |
| UPPER END OF 2ND PARTITION PLATE 12b | −83 | +101 |
| LOWER END OF 2ND PARTITION PLATE 12b | −83 | +81 |
| LEFT END OF 3RD PARTITION PLATE 12c | −98 | +53.5 |
| RIGHT END OF 3RD PARTITION PLATE 12c | −79 | +69 |
| LEFT END OF 4TH PARTITION PLATE 12d | −72.5 | +72.5 |
| RIGHT END OF 4TH PARTITION PLATE 12d | −50.5 | +50.5 |
| LEFT END OF 5TH PARTITION PLATE 12e | −22 | +42.5 |
| RIGHT END OF 5TH PARTITION PLATE 12e | +4 | +70.5 |

According to the present invention, there is provided a circular saw having a dust collecting function comprising a main body accommodating a motor therein, a sawing blade rotated by the motor, a base provided at a lower part of the main body, a dust casing covering an upper part of the sawing blade for collecting chip dust, and deceleration means provided in the dust casing for decelerating the chip dust when the dust-containing air is introduced in the dust casing.

With the provision of deceleration means, chip dust can be effectively collected or settled on the bottom of the dust casing even if the chip dust has a smaller specific gravity. Thus it becomes possible to increase the efficiency of dust collection.

According to the features of the preferred embodiment, the deceleration means is a partition plate or a stepped portion which has a surface perpendicular to a plane of the sawing blade.

Furthermore, according to the features of the preferred embodiment, the dust casing has a side wall recessed inward. Such a recessed configuration of the side wall makes it possible to visually recognize the leading edge of the sawing blade from the rearward direction of the portable circular saw. This arrangement is advantageous when the portable circular saw is used in a specific sawing operation requiring frequent and random interruption of sawing operation.

Still further, according to the features of the preferred embodiment, the base is an aluminum casting product which enhances the rigidity of the base and maintains the accuracy of a plane. Accordingly, even if a large force is applied during the sawing operation, it becomes possible to surely prevent any gap from being formed between the base and the construction material to be cut, while maintaining a higher efficiency of dust collection.

Moreover, according to the features of the preferred embodiment, the link portion is provided on the base, so as to be rotatable about the pivot and fixed at an adjusted angle with respect to the base by the screw. With this arrangement, the perpendicularity between the base and the sawing blade can be easily adjusted any time, even if the link portion is accidentally bent under a strong force applied during the sawing operation. Thus, this arrangement surely prevents the dust collecting efficiency from being deteriorated.

As this invention may be embodied in several forms without departing from the spirit of essential characteristics thereof, the present embodiment described is therefore intended to be only illustrative and not restrictive, since the scope of the invention is defined by the appended claims rather than by the description preceding them, and all changes that fall within metes and bounds of the claims, or equivalents of such metes and bounds, are therefore intended to be embraced by the claims.

What is claimed is:

1. A portable circular saw having a dust collecting function comprising:

a main body accommodating a motor therein;

a sawing blade rotated by said motor;

a base provided at a lower part of said main body;

a dust casing covering an upper part of said sawing blade for collecting chip dust; and deceleration means provided in said dust casing for decelerating said chip dust when said chip dust is introduced together with air in said dust casing, said decelerating means including a combination of a partition plate and a step-up portion, said partition plate extends downward from an upper inside wall of said dust casing while said step-up portion is provided on said upper inside wall near said partition plate, so that dust-containing air collides with said step-up portion immediately before said chip dust reaches said partition plate.

2. A portable circular saw having a dust collecting function comprising:

a main body accommodating a motor therein;

a sawing blade rotated by said motor;

a base provided at a lower part of said main body;

a dust casing covering an upper part of said sawing blade for collecting chip dust and having a side wall recessed inward; and deceleration means provided in said dust casing for decelerating said chip dust when said chip dust is introduced together with air in said dust casing.

3. A portable circular saw having a dust collecting function comprising:

a main body accommodating a motor therein;

a sawing blade rotated by said motor;

a base provided at a lower part of said main body;

a dust casing covering an upper part of said sawing blade for collecting chip dust having an opening at a position just above a leading edge of said sawing blade; and deceleration means comprising a plurality of partition plates separately arranged in a hollow space in said dust casing for decelerating said chip dust when said chip dust is introduced together with air in said dust casing, one of said plurality of partition plates being disposed near said opening so as to reflect said introduced air containing said chip dust.

4. A portable circular saw having a dust collecting function comprising:

a main body accommodating a motor therein;

a sawing blade rotated by said motor;

a base provided at a lower part of said main body;

a dust casing covering an upper part of said sawing blade for collecting chip dusk said dust casing including a generally circular collection path in the plane of said blade; and deceleration means provided in said dust casing collection path including a deflecting means extending perpendicular to said blade plane to deflect particles in said path for decelerating said chip dust when said chip dust is introduced together with air in said dust casing.

5. The portable circular saw in accordance with claim 4, wherein said deflecting means is a partition plate or a stepped portion.

6. The portable circular saw in accordance with claim 4, wherein said base is an aluminum casting product.

7. The portable circular saw in accordance with claim 4, wherein said deflecting means is a plurality of partition plates separately arranged in a hollow space in said dust casing.

8. The portable circular saw in accordance with claim 7, wherein said plurality of partition plates form said collection path for guiding and decelerating introduced air containing said chip dust, said collection path having an entire length smaller than that of an inside wall of said dust casing.

9. The portable circular saw in accordance with claim 7, wherein some of said plurality of partition plates separate the flow of said introduced air containing said chip dust into two directions.

10. The portable circular saw in accordance with claim 7, wherein all of said plurality of partition plates are provided in the upper half of said dust casing.

11. The portable circular saw in accordance with claim 4, wherein said collection path is triangular.

* * * * *